(12) United States Patent
Seavey et al.

(10) Patent No.: US 8,322,249 B2
(45) Date of Patent: Dec. 4, 2012

(54) ROBOT ARM ASSEMBLY

(75) Inventors: Nathaniel J. M. Seavey, Waltham, MA (US); Christopher J. Langford, Wakefield, MA (US)

(73) Assignee: Foster-Miller, Inc., Waltham, MA (US)

( * ) Notice: Subject to any disclaimer, the term of this patent is extended or adjusted under 35 U.S.C. 154(b) by 743 days.

(21) Appl. No.: 12/317,131

(22) Filed: Dec. 18, 2008

(65) Prior Publication Data

US 2010/0158656 A1     Jun. 24, 2010

(51) Int. Cl.
*B25J 18/00* (2006.01)
(52) U.S. Cl. .................. 74/490.01; 74/490.04; 901/21; 901/25
(58) Field of Classification Search ............... 74/490.01, 74/490.04, 89.21, 490.05, 490.06; 901/15, 901/21, 23, 25; 180/9.32; 89/45, 46, 36.13, 89/36.14, 37.12; 384/58, 441, 449, 549
See application file for complete search history.

(56) References Cited

U.S. PATENT DOCUMENTS

| | | | |
|---|---|---|---|
| 429,903 A | 6/1890 | Gregg | |
| 816,236 A | 3/1906 | Kline | |
| 832,541 A | 10/1906 | Dodge | |
| 1,350,124 A | 8/1920 | Venable | |
| 1,479,310 A | 1/1924 | Monroe | |
| 2,132,795 A | 10/1938 | Minier | |
| 2,221,192 A | 11/1940 | Juhl | |
| 2,594,763 A | 4/1952 | Freyer | |
| 2,613,100 A | 10/1952 | Casey, Jr. | |
| 2,617,203 A * | 11/1952 | Murray | .............................. 34/82 |
| 2,617,211 A | 11/1952 | Olson | |
| 2,665,434 A | 1/1954 | Saunders | |
| 2,710,765 A | 6/1955 | Arens | |
| 2,891,813 A | 6/1959 | Inaki | |
| 2,926,865 A | 3/1960 | Humphreys | |
| 3,042,440 A | 7/1962 | Weil, Sr. et al. | |
| 3,108,498 A | 10/1963 | James et al. | |
| 3,202,449 A | 8/1965 | Lemelson | |
| 3,247,979 A | 4/1966 | Melton et al. | |
| 3,370,213 A | 2/1968 | Rose | |
| RE26,904 E | 5/1970 | Lemelson | |
| 3,558,177 A | 1/1971 | Snead | |
| 3,645,578 A | 2/1972 | Renfroe | |
| 3,765,347 A | 10/1973 | Tormstrom | |
| 3,866,966 A | 2/1975 | Skinner, II | |
| 3,914,884 A | 10/1975 | Guinot | |
| 3,920,137 A | 11/1975 | McCain | |

(Continued)

FOREIGN PATENT DOCUMENTS

EP        24751 A1    3/1981

(Continued)

OTHER PUBLICATIONS

Written Opinion of the International Searching Authority, Application No. PCT/US2008/013608, mailed Feb. 11, 2009, 9 pgs. (unnumbered).

*Primary Examiner* — Phillip A Johnson
(74) *Attorney, Agent, or Firm* — Iandiorio Teska & Coleman, LLP (57) ABSTRACT

A robot arm assembly includes a turret, a lower arm pivotable with respect to the turret, and an upper arm pivotable with respect to the lower arm.

21 Claims, 8 Drawing Sheets

U.S. PATENT DOCUMENTS

| | | |
|---|---|---|
| 3,952,880 A | 4/1976 | Hill et al. |
| 4,000,784 A | 1/1977 | Morrow, Sr. et al. |
| 4,062,455 A | 12/1977 | Flatau |
| 4,097,084 A | 6/1978 | Russell |
| 4,114,464 A | 9/1978 | Schubert et al. |
| 4,281,866 A | 8/1981 | Atcheson |
| 4,367,893 A | 1/1983 | Berg |
| 4,370,091 A | 1/1983 | Gagliardi |
| 4,456,293 A | 6/1984 | Panissidi |
| 4,478,451 A | 10/1984 | Brucher et al. |
| 4,489,969 A | 12/1984 | Merry |
| 4,494,441 A | 1/1985 | Magnuson |
| 4,501,522 A | 2/1985 | Causer et al. |
| 4,512,524 A | 4/1985 | Shigemizu |
| 4,600,355 A * | 7/1986 | Johnson ................. 414/680 |
| 4,600,357 A | 7/1986 | Coules |
| 4,621,562 A | 11/1986 | Carr et al. |
| D287,218 S | 12/1986 | Portz |
| 4,645,409 A | 2/1987 | Gorman |
| 4,648,464 A | 3/1987 | Huxley |
| 4,678,220 A | 7/1987 | Gabriel |
| 4,697,838 A | 10/1987 | Hartman |
| 4,699,414 A | 10/1987 | Jones |
| 4,709,265 A | 11/1987 | Silverman et al. |
| 4,738,576 A | 4/1988 | Eberle et al. |
| 4,766,775 A | 8/1988 | Hodge |
| 4,773,298 A | 9/1988 | Tischer et al. |
| 4,778,211 A | 10/1988 | Gabriel |
| 4,784,422 A | 11/1988 | Jones et al. |
| 4,810,019 A | 3/1989 | Brucher |
| 4,822,233 A | 4/1989 | Hansel |
| 4,822,238 A | 4/1989 | Kwech |
| 4,865,400 A | 9/1989 | Caron et al. |
| 4,932,831 A | 6/1990 | White et al. |
| 4,941,416 A | 7/1990 | Faulring |
| 4,993,914 A | 2/1991 | Riddle |
| 5,024,397 A | 6/1991 | Edwards et al. |
| 5,033,785 A | 7/1991 | Woolley, Jr. |
| 5,060,378 A | 10/1991 | LaBounty et al. |
| 5,063,628 A | 11/1991 | Campbell |
| 5,081,941 A | 1/1992 | Weeks |
| 5,098,024 A | 3/1992 | MacIntyre et al. |
| 5,195,388 A | 3/1993 | Zona et al. |
| 5,222,409 A * | 6/1993 | Dalakian ................. 74/479.01 |
| 5,360,071 A | 11/1994 | Bergendorf |
| 5,385,311 A | 1/1995 | Morikawa et al. |
| 5,427,424 A | 6/1995 | Robinson |
| 5,435,405 A | 7/1995 | Schempf et al. |
| 5,440,916 A | 8/1995 | Stone et al. |
| 5,443,354 A | 8/1995 | Stone et al. |
| 5,474,242 A | 12/1995 | Rafn |
| 5,485,691 A | 1/1996 | Stevens et al. |
| 5,570,992 A | 11/1996 | Lemelson |
| 5,600,904 A | 2/1997 | Bowling |
| 5,672,044 A | 9/1997 | Lemelson |
| 5,769,341 A | 6/1998 | Morikawa et al. |
| 5,842,427 A | 12/1998 | Hunter et al. |
| 5,872,892 A | 2/1999 | Brown et al. |
| 5,921,302 A | 7/1999 | Petersen |
| 6,113,343 A | 9/2000 | Goldenberg et al. |
| 6,217,094 B1 | 4/2001 | Hanaduka et al. |
| 6,236,906 B1 | 5/2001 | Müller |
| 6,283,220 B1 | 9/2001 | Carter |
| 6,338,512 B1 | 1/2002 | Ruppert et al. |
| 6,341,568 B1 | 1/2002 | Culley |
| 6,341,933 B1 | 1/2002 | Gagnon et al. |
| 6,377,872 B1 | 4/2002 | Struckman |
| 6,431,296 B1 | 8/2002 | Won |
| 6,491,127 B1 | 12/2002 | Holmberg et al. |
| 6,508,496 B1 | 1/2003 | Huang |
| 6,523,284 B1 | 2/2003 | Clugston |
| 6,526,678 B2 | 3/2003 | Waddington, Jr. |
| 6,615,753 B1 | 9/2003 | Culley |
| 6,702,050 B1 | 3/2004 | Mazhar |
| 6,722,296 B2 | 4/2004 | Reilly |
| 6,766,973 B2 | 7/2004 | Muri |
| 6,842,674 B2 | 1/2005 | Solomon |
| 6,904,976 B1 | 6/2005 | Zach et al. |
| 6,999,849 B2 | 2/2006 | Bridges |
| 7,104,576 B1 | 9/2006 | Dorr |
| 2004/0006824 A1 | 1/2004 | Huang |
| 2004/0030448 A1 | 2/2004 | Solomon |
| 2004/0030450 A1 | 2/2004 | Solomon |
| 2004/0030451 A1 | 2/2004 | Solomon |
| 2004/0030570 A1 | 2/2004 | Solomon |
| 2004/0068416 A1 | 4/2004 | Solomon |
| 2004/0134336 A1 | 7/2004 | Solomon |
| 2005/0204850 A1 | 9/2005 | Nihei et al. |
| 2006/0156852 A1 | 7/2006 | Haniya |
| 2006/0192515 A1 | 8/2006 | Takayama et al. |
| 2006/0283054 A1 | 12/2006 | Crow |
| 2006/0289178 A1 | 12/2006 | Basek |
| 2007/0097382 A1* | 5/2007 | Granger ................. 356/620 |
| 2007/0107917 A1 | 5/2007 | Doherty et al. |
| 2008/0073922 A1 | 3/2008 | Holtz |
| 2008/0083344 A1 | 4/2008 | Deguire et al. |
| 2008/0296920 A1 | 12/2008 | Kipping et al. |
| 2009/0071281 A1* | 3/2009 | Fisk et al. ................. 74/490.03 |
| 2009/0129003 A1 | 5/2009 | Bruck et al. |
| 2009/0164045 A1 | 6/2009 | Deguire et al. |
| 2010/0095799 A1 | 4/2010 | Albin et al. |
| 2010/0101356 A1 | 4/2010 | Albin |
| 2010/0158656 A1 | 6/2010 | Seavey |
| 2010/0164243 A1 | 7/2010 | Albin |

FOREIGN PATENT DOCUMENTS

| | | |
|---|---|---|
| WO | WO2004003680 | 1/2004 |
| WO | WO 2007/088206 | 8/2007 |

* cited by examiner

ROBOT ARM ASSEMBLY

FIELD OF THE INVENTION

The subject invention relates to arms for remotely controlled robots.

BACKGROUND OF THE INVENTION

Mobile, remotely controlled robots are becoming increasingly popular for use by the military, SWAT units, and police and fire departments. The applicant's Talon® robot for example, includes an arm with an end effector, several cameras, several antennas, and a deployable mast.

The Talon® arm assembly includes a lower arm which pivots up and down with respect to the robot chassis. An upper arm is pivotable with respect to the lower arm via a chain drive extending along side the lower arm.

There is a need for robot arms for remotely controlled robots including, but not limited to, the Talon® robot which are capable of lifting heavier loads. There is also a need to rotate the lower and upper arms for added maneuverability.

Presently, since the Talon® upper arm chain drive is disposed alongside the lower arm, the lifting capability of the upper arm is limited and a bending moment~normal to the plane of movement is induced when the upper arm is loaded.

U.S. patent application Ser. No. 11/901,200 filed Sep. 13, 2007, incorporated herein by this reference, discloses a robot arm shoulder able to rotate the lower arm. In some robot applications, it would be desirable to include a turret rotatable 360°. Known turrets include large diameter bearings. Unfortunately, such bearings are expensive.

Any viable robot arm assembly must be fairly robust since remotely controlled robots are often used in extremely harsh and hostile conditions.

BRIEF SUMMARY OF THE INVENTION

It is therefore an object of this invention to provide a new robot arm assembly useful in connection with various robot chassis designs.

It is a further object of this invention to provide such a robot arm assembly which is modular and easy to incorporate with any robot chassis.

It is a further object of this invention to provide such a robot arm assembly which includes a turret able to rotate the upper and lower robot arms.

It is a further object of this invention to provide such a robot arm assembly which features a strong robot arm.

It is a further object of this invention to provide such a robot arm assembly which is fairly robust and yet in the preferred embodiment does not include expensive components such as large diameter bearings.

The subject invention results from the realization that, in one example, a less expensive robot arm turret design includes a V-ring rotatably supported by a set of V-wheels which can be attached to a wide variety of robot chassis designs and that a new robot arm assembly includes a lower arm pivotable with respect to the turret and an upper arm pivotable with respect to the lower arm via a chain drive residing within the lower arm.

This invention features a robot arm assembly comprising a turret base unit, a lower arm pivotable with respect to the turret base unit via a lower arm drive train, and an upper arm pivotable with respect to the lower arm at an elbow including a first sprocket rotatable with respect to the lower arm but fixed with respect to the upper arm. A second sprocket is rotated by an upper arm drive train and a chain extends within the lower arm between the first and second sprockets for raising and lowering the upper arm. The chain is preferably centrally located within the lower arm.

In one example, the elbow includes first and second curved brackets attached to opposite sides of the first sprocket and disposed between spaced sidewalls of the lower arm. The typical upper arm drive train includes an upper arm drive shaft fixed with respect to a sleeve within the second sprocket. A pair of spaced stanchions supports the sleeve which is rotatable with respect to the stanchions. The upper arm drive train may further include a first motor/gear reduction unit driving a gear attached to the upper arm drive shaft and a first gear train between the first motor/gear reduction unit and the gear attached to the upper arm drive shaft.

The typical lower arm drive train includes a lower arm drive shaft fixed with respect to a bracket connected to the lower arm. The lower arm drive train may further include a second motor/gear reduction unit driving a gear attached to the lower arm drive shaft and a second gear train between the second motor/gear reduction unit and the gear attached to the lower arm drive shaft.

The typical turret base unit includes a V-ring, a turret gear fixed with respect thereto, and a set of V-wheels rotatably supporting the V-ring. A third motor/gear reduction unit may be used to drive the turret gear and there may be a third gear train between the third gear/motor reduction unit and the turret gear. Quick release mounts can be used to secure the turret base unit to a robot chassis.

A robot arm assembly in accordance with the subject invention typically features a turret base unit including a V-ring, a turret gear fixed with respect to the V-ring and driven by a turret base mounted motor and drive train, and a set of V-wheels for rotatably supporting the V-ring with respect to the turret base. An upper arm is pivotable with respect to the lower arm at an elbow via an upper arm gear box mounted to the turret base unit. The typical elbow includes a first sprocket rotatable with respect to the lower arm but fixed with respect to the upper arm. A second sprocket is rotated by the upper arm gear box and a chain extends within the lower arm between the first and second sprockets for raising and lowering the upper arm. An upper arm drive shaft is fixed with respect to a sleeve within the second sprocket and driven by the upper arm gear box. A first motor/gear reduction unit may be used to drive the upper arm gear box.

Typically, a lower arm drive shaft is fixed with respect to a bracket connected to the lower arm and driven by the lower arm gear box. A second motor/gear reduction unit may be used to drive the lower arm gearbox.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
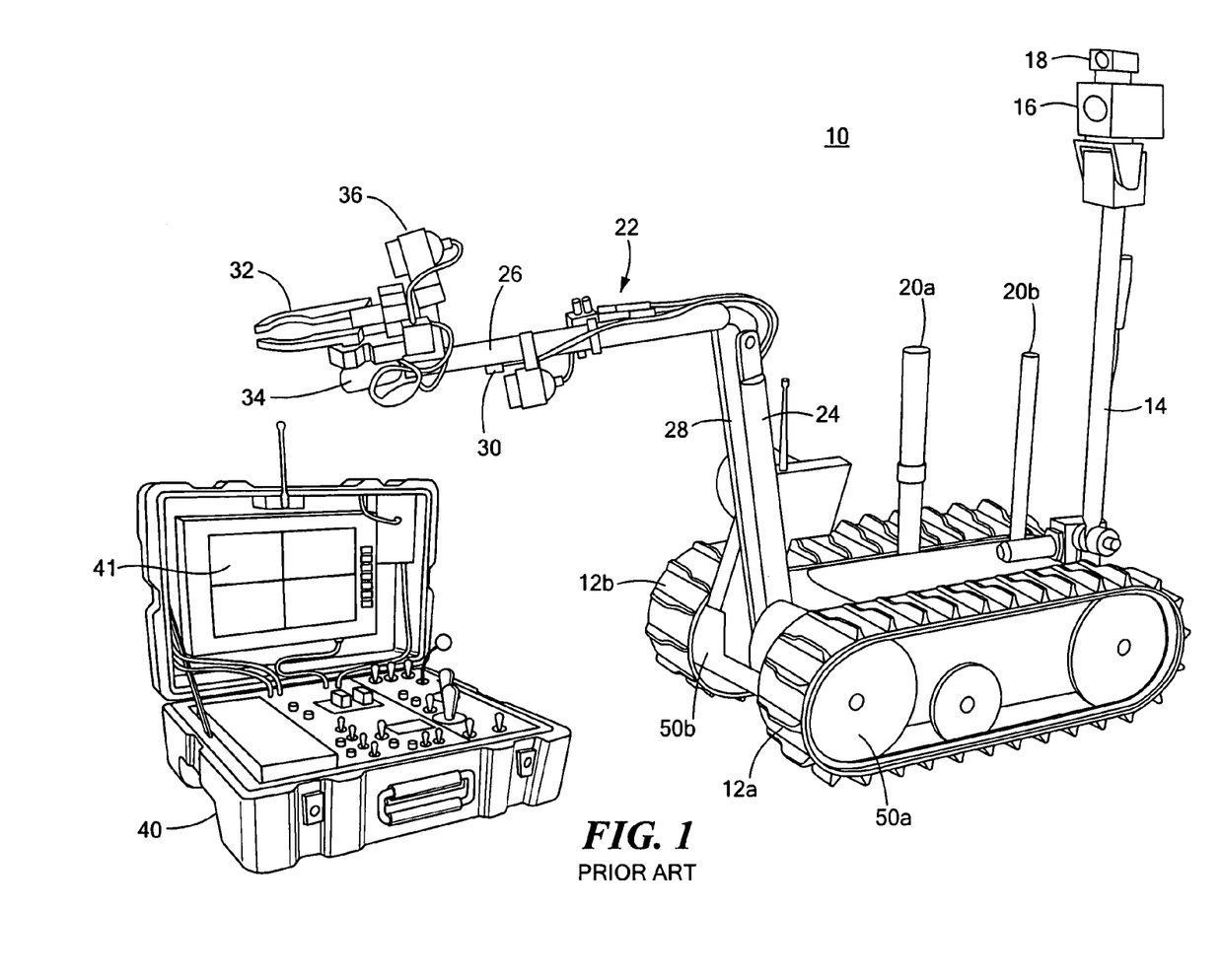
FIG. 1 is a schematic three-dimensional front view of an example of the applicant's existing Talon® robot including an arm assembly with upper and lower arms.

FIG. 1 shows Talon® robot 10 driven by tracks 12a and 12b including deployable mast 14, zoom camera 16, light 18, antennas 20a and 20b, and arm assembly 22. Arm assembly 22 includes lower arm 24 and upper arm 26. Lower arm 24 is able to pitch up and down. Upper arm 26 pitches with respect to lower arm 24 and is driven by chain drive 28 extending along the side of lower arm 24. Camera 30 is on upper arm as is gripper 32 which rotates via wrist 34. Camera 36 is typically aimed at gripper 32. Operator control unit 40 is used to wirelessly control robot 10 as is known in the art. The various images captured by the cameras of the robot may be displayed on view screen 41.

Figure 2:
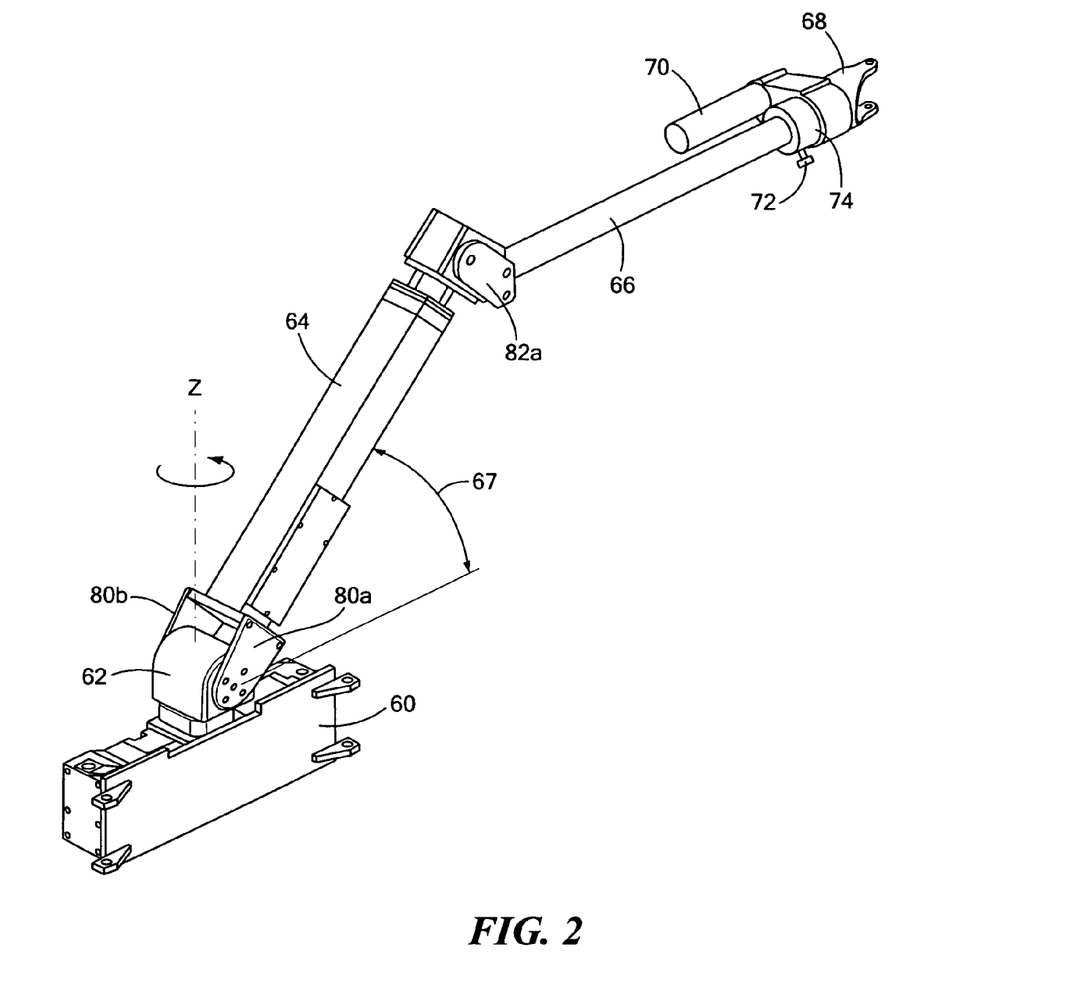
FIG. 2 is a schematic three-dimensional front view showing an example of a robot arm assembly with a rotatable shoulder in accordance with U.S. patent application Ser. No. 11/901,200.

In accordance with one new robot arm assembly design as depicted in FIG. 2, base unit 60 includes shoulder assembly 62 rotatably disposed thereon to turn lower arm 64 about axis Z. Robot arm 64 pitches up and down as shown by arrow 67. Upper robot arm 66 also pitches up and down relative to lower robot arm 64 and is driven by a motor/gear train combination inside lower arm 64. Upper arm 66 terminates at rotating wrist 68 driven by motor 70. By pulling pin 72 in collar 74, upper arm 66 telescopes outward. See U.S. application Ser. No. 11/901,200 filed Sep. 13, 2007.

Figure 3:
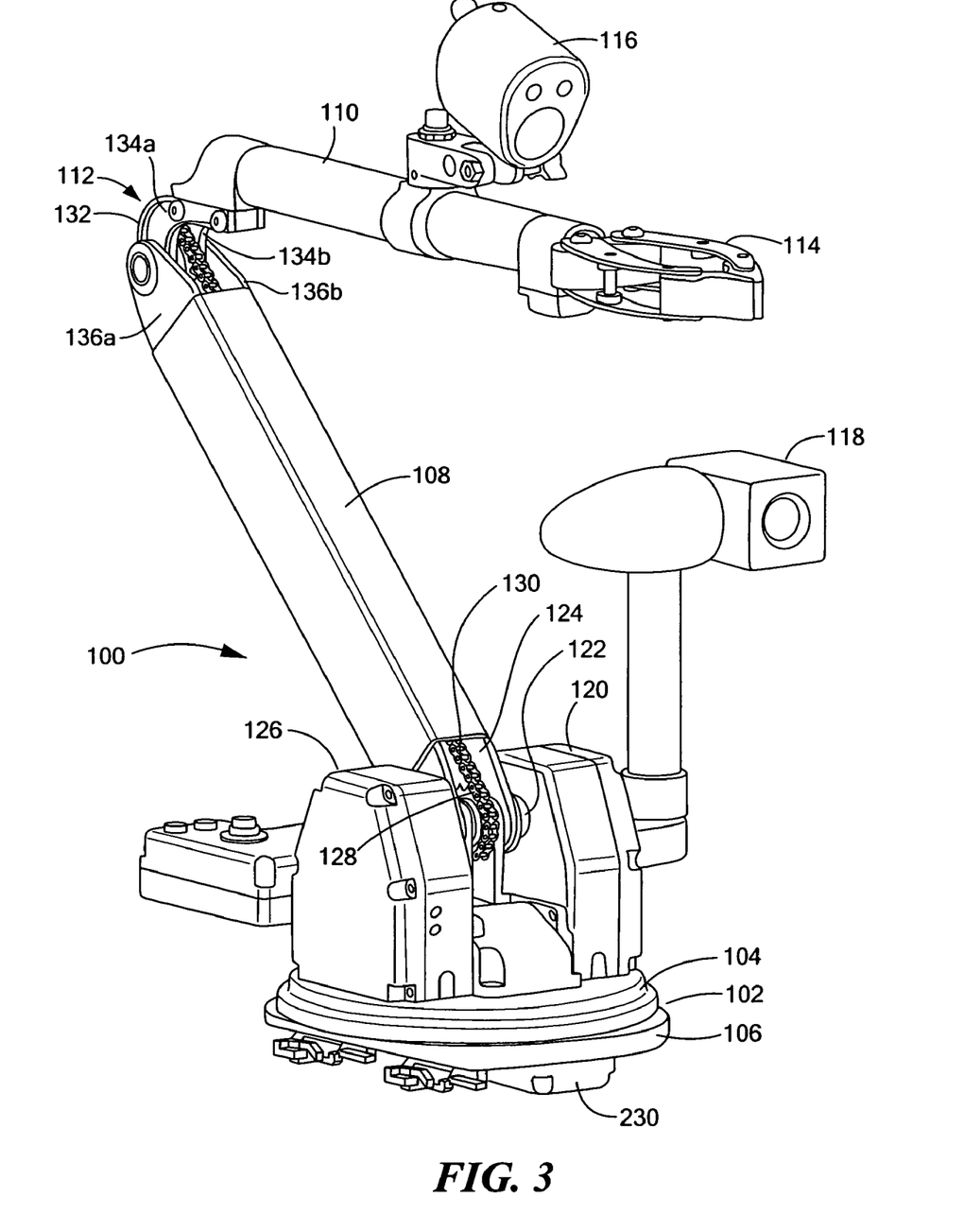
FIG. 3 is a schematic three-dimensional front view showing an example of a new robot arm assembly in accordance with the subject invention.

The subject invention, in one preferred example, features robot arm assembly 100, FIG. 3 with turret base unit 102. Turret 104 rotates with respect to stationary base 106. Lower arm 108 pivots up and down with respect to turret 104 and upper arm 110 pivots up and down with respect to lower arm 108 at elbow 112. End effector gripper 114 is shown at the distal end of upper arm 110. Camera 116 may be disposed on upper arm 110 and camera 118 may be provided on turret base unit 102. Other typical sub-assemblies associated with a remotely controlled robot may also be present on turret base unit 102 including the antennas and other items shown associated with the robot shown in FIG. 1. The result is a modular unit that may be used in conjunction with many different robot platforms.

Typically, lower arm gear box 120 on turret 104 drives shaft 122 fixed to lower arm bracket 124 to raise and lower arm 108. Upper arm gear box 126 on turret 104 drives sprocket 128. Chain 130 extends around sprocket 128 and is disposed centrally within lower arm 108 extending to sprocket 132 at elbow 112 rotatable with respect to lower arm 108 but fixed to upper arm 110 via curved brackets 134a and 134b between sidewalls 136a and 136b of lower arm 108. In this way, the rotation of chain 130 raises and lowers upper arm 110 with respect to lower arm 108. Bending moments normal to plane of movement are eliminated since chain 130 is centrally disposed within lower arm 108.

Figure 4:
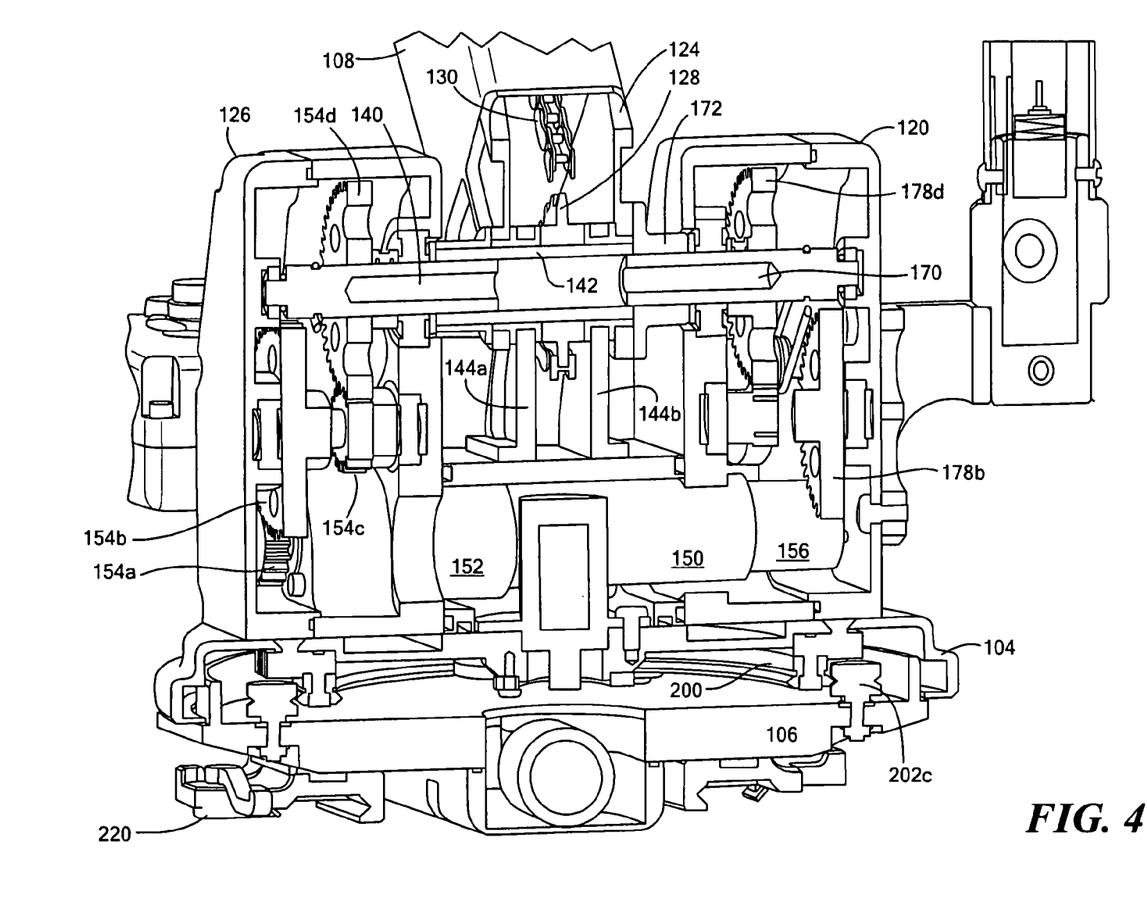
FIG. 4 is a schematic partial cross-sectional view showing the drive trains for the upper and lower robot arm shown in FIG. 3.
Figure 5:
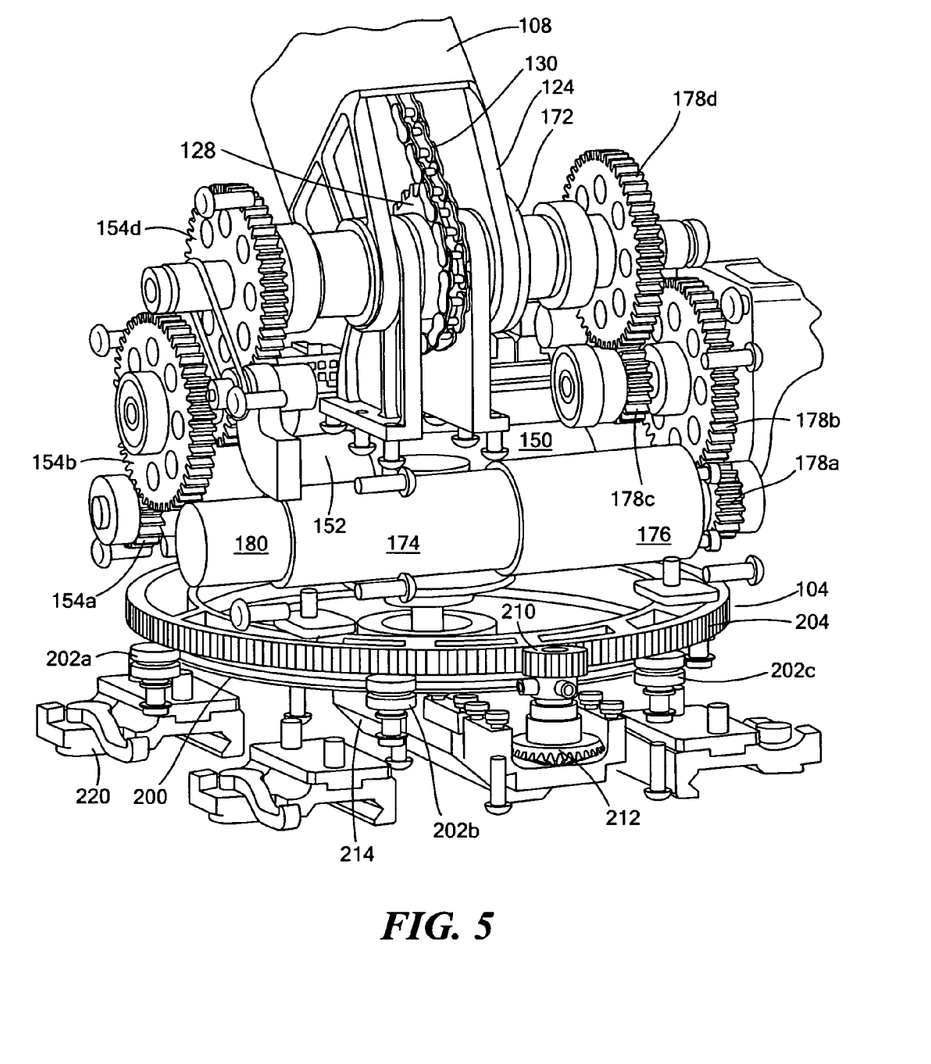
FIG. 5 is a schematic three-dimensional view showing the primary components associated with the turret subsystem of the subject invention and also showing additional details concerning the upper and lower arm drive assemblies.
Figure 6:
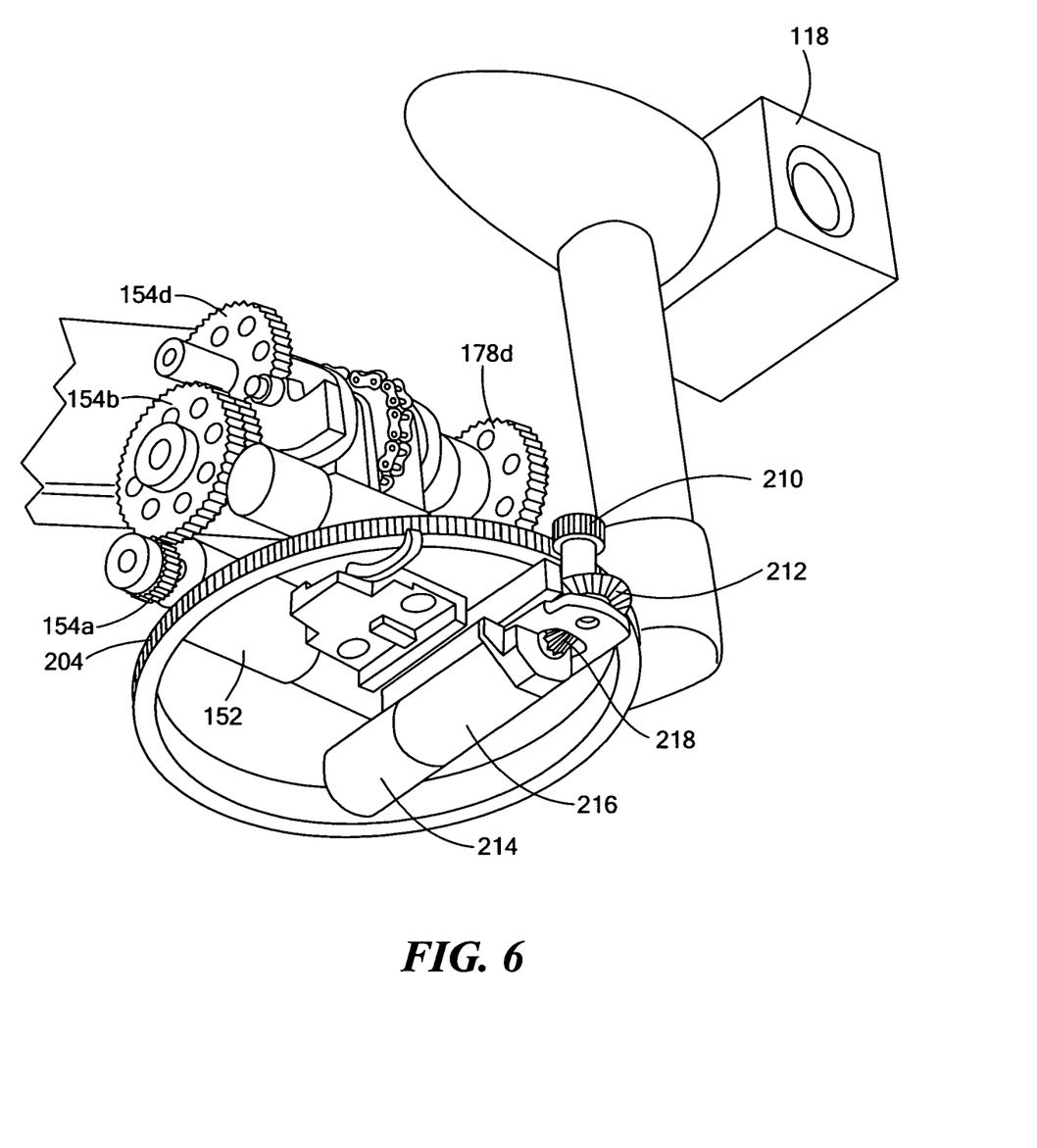
FIG. 6 is a schematic three-dimensional bottom view again showing a turret drive subassembly in accordance with an example of the subject invention.

In one preferred design, upper arm gearbox 126, FIGS. 4-6 includes a drive train including upper arm drive shaft 140 fixed (e.g., keyed) with respect to sleeve 142 fixed (e.g., keyed) to sprocket 128. Stanchions 144a and 144b support sleeve 142 as it rotates to drive sprocket 128 and chain 130. Upper arm motor 150 via gear reduction unit 152 drives gear 154a, which drives gear 154b, which drives gear 154c, which drives gear 154d attached to upper arm drive shaft 140. Brake unit 156 may also be provided to lock the upper arm into position when no power is applied to motor 150.

Lower arm gear box 120 includes a drive train including lower arm drive shaft 170 fixed to coupling 172 better seen in FIG. 5. Coupling 172 is bolted to lower arm bracket 124. Lower arm motor 174 and reducer 176 drives gear 178a which drives gear 178b, driving gear 178c, which drives gear 178d to rotate shaft 170, FIG. 4 to raise and lower arm 108. Break 180 may also be provided for lower arm drive motor 174.

Turret 104, in one example, includes V-ring 200 rotatably supported via V-wheels 202a-c (there are typically four or more V-wheels fixed to the turret base). Turret gear 204 is fastened to V-ring 200. Turret gear 204 is driven by a gear train including pinion 210 and bevel gear 212 driven by motor 214 and gear reduction unit 216 (FIG. 6) which drives gear 218 to drive bevel gear 212 driving pinion 210 to rotate turret gear 204 and V-ring 200 to rotate the turret.

Each V-wheel 202, FIG. 5 is preferably rotatably disposed with respect to the turret base to which a robot chassis mount may be attached as shown for mount 220. Thus, on any robot chassis, these mounts 220 are secured (via clamps, for example, mounted to rails on the top of the robot chassis).

Figure 7:
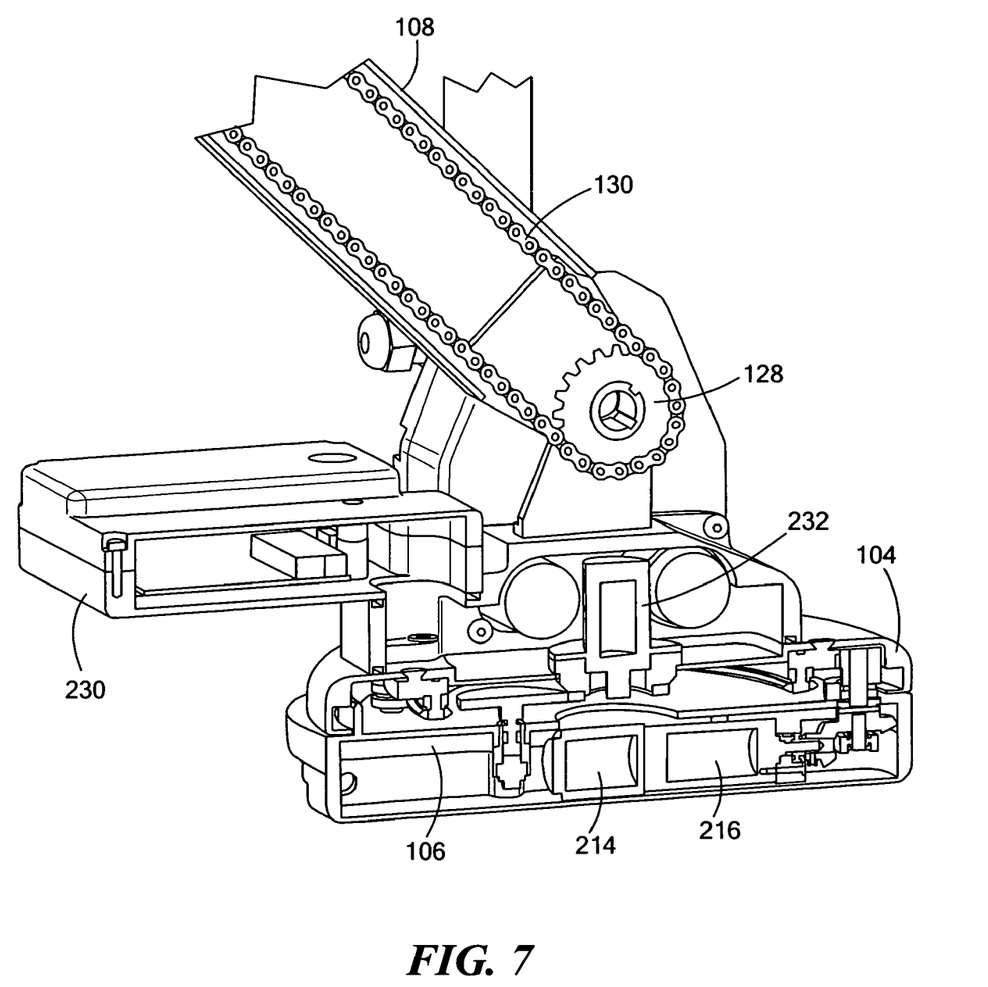
FIG. 7 is a schematic three-dimensional partially cut-away side view showing several components associated with the robot arm assembly of the subject invention.
Figure 8:
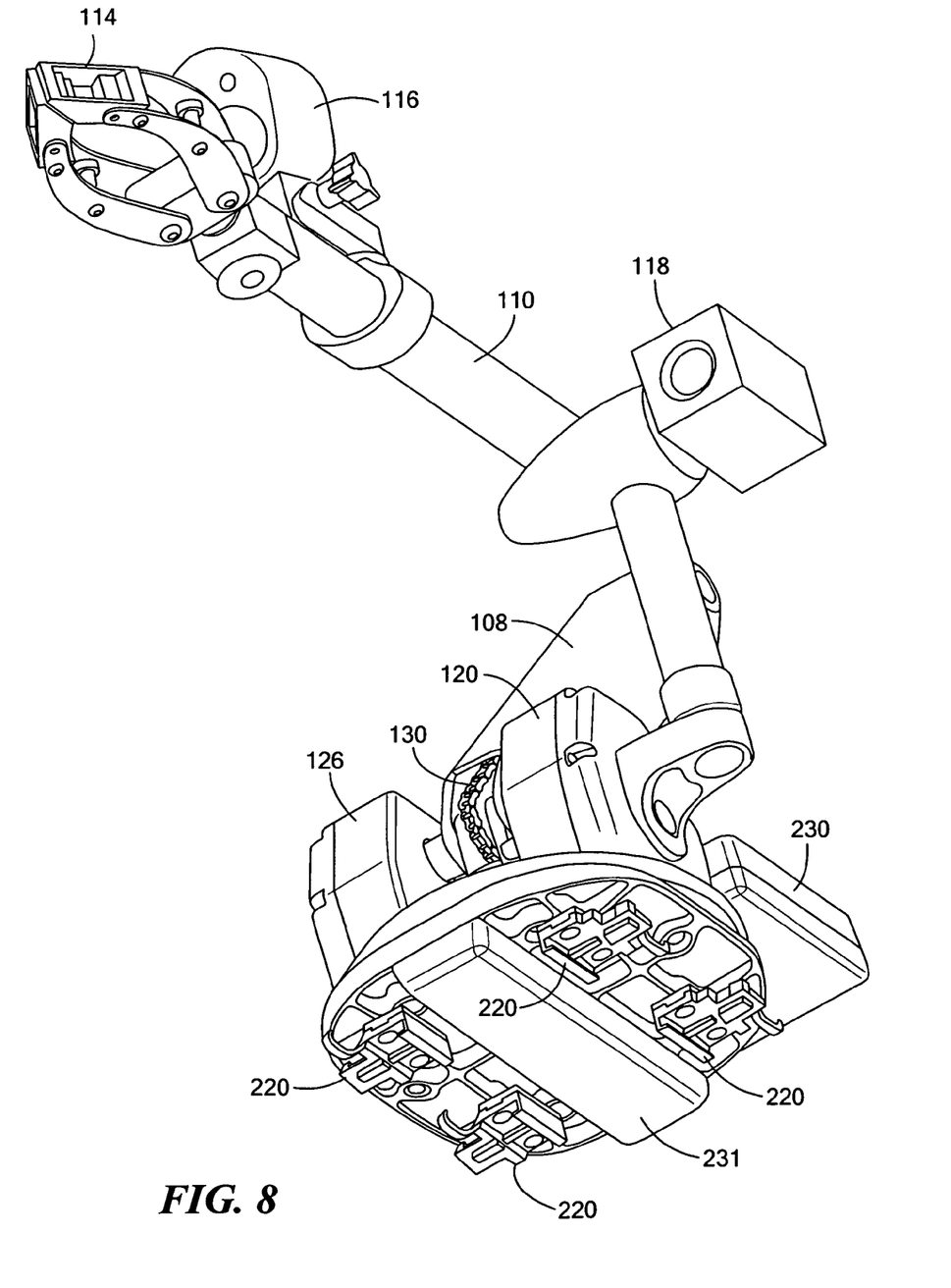
FIG. 8 is a schematic three-dimensional bottom view of the robot arm assembly of FIG. 3.

The result in the preferred embodiment is a strong arm assembly with pivotable upper and lower arms all mounted to a rotatable turret. Indeed, the arm and turret motor controller electronics are typically packaged in package 230, FIG. 7. Slip ring 232 provides the ability to electrically interconnect any electrically controlled sub-assemblies associated with the turret and arms with any corresponding sub-assemblies associated with the robot chassis. FIG. 8 further depicts the modular of design of the subject robot arm and turret assembly ready for mounting to a robot chassis with the turret motor/reduction unit protected behind cover 231.

The result in any embodiment is a new robot arm assembly useful in connection with various robot chassis designs and easy to incorporate therewith due to its modular configuration.

Although specific features of the invention are shown in some drawings and not in others, however, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments:

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A robot arm assembly comprising:
   a turret base unit;
   a lower arm pivotable with respect to the turret base unit via a lower arm drive train;
   an upper arm pivotable with respect to the lower arm at an elbow including a first sprocket rotatable with respect to the lower arm but fixed with respect to the upper arm;
   a second sprocket associated with the lower arm rotated by an upper arm drive train, said upper arm drive train including an upper arm drive shaft fixed with respect to a sleeve within the second sprocket; and
   a chain centrally located and extending within the lower arm between the first and second sprockets for raising and lowering the upper arm.

2. The robot arm assembly of claim 1 in which the elbow includes first and second curved brackets attached to opposite sides of the first sprocket and disposed between spaced sidewalls of the lower arm.

3. The robot arm assembly of claim 1 further including a pair of spaced stanchions supporting the sleeve, the sleeve rotatable with respect to the stanchions.

4. The robot arm assembly of claim 1 in which the upper arm drive train further includes a first motor/gear reduction unit driving a gear attached to the upper arm drive shaft.

5. The robot arm assembly of claim 4 further including a first gear train between the first motor/gear reduction unit and the gear attached to the upper arm drive shaft.

6. The robot arm assembly of claim 1 in which the lower arm drive train includes a lower arm drive shaft fixed with respect to a bracket connected to the lower arm.

7. The robot arm assembly of claim 6 in which the lower arm drive train further includes a second motor/gear reduction unit driving a gear attached to the lower arm drive shaft.

8. The robot arm assembly of claim 7 further including a second gear train between the second motor/gear reduction unit and the gear attached to the lower arm drive shaft.

9. The robot arm assembly of claim 1 in which the turret base unit includes a V-ring and a turret gear fixed with respect thereto.

10. The robot arm assembly of claim 9 further including a set of V-wheels rotatably supporting the V-ring.

11. The robot arm assembly of claim 9 further including a third motor/gear reduction unit for driving the turret gear.

12. The robot arm assembly of claim 11 further including a third gear train between the third gear/motor reduction unit and the turret gear.

13. The robot arm assembly of claim 1 further including quick release mounts for securing the turret base unit to a robot chassis.

14. A robot arm assembly comprising:
    a turret base unit including:
       a V-ring,
       a turret gear fixed with respect to the V-ring and driven by a motor and drive train, and
       a set of V-wheels for rotatably supporting the V-ring;
    a lower arm pivotable with respect to the turret base unit via a lower arm gear box mounted to the turret base unit;
    an upper arm pivotable with respect to the lower arm at an elbow via an upper arm gear box mounted to the turret base unit, said elbow including a first sprocket rotatable with respect to the lower arm but fixed with respect to the upper arm; a second sprocket associated with the lower arm rotated by the upper arm gear box and a chain extending within the lower arm between the first and second sprockets for raising and lowering the upper arm; and
    an upper arm drive shaft fixed with respect to a sleeve within the second sprocket and driven by the upper arm gear box.

15. The robot arm assembly of claim 14 in which the chain is centrally located within the lower arm.

16. The robot arm assembly of claim 14 in which the elbow includes first and second curved brackets attached to opposite sides of the first sprocket and disposed between spaced side walls of the lower arm.

17. The robot arm assembly of claim 14 further including a pair of spaced stanchions supporting the sleeve, the sleeve rotatable with respect to the stanchions.

18. The robot arm assembly of claim 14 further including a motor/gear reduction unit driving the upper arm gear box.

19. The robot arm assembly of claim 14 further including a lower arm drive shaft fixed with respect to a bracket connected to the lower arm and driven by the lower arm gear box.

20. The robot arm assembly of claim 14 further including a motor/gear reduction unit driving the lower arm gearbox.

21. The robot arm assembly of claim 14 further including quick release mounts for securing the turret base unit to a robot chassis.

* * * * *